2,850,505

TETRAPHENYLTETRAZAPORPHINS

Delton W. Hein, Somerville, N. J., assignor to American Cyanamid Company, New York, N. Y., a corporation of Maine No Drawing. Application February 14, 1955
Serial No. 488,160

3 Claims. (Cl. 260—314)

This invention relates to novel coloring matters of the tetrazaporphin series of the formula:

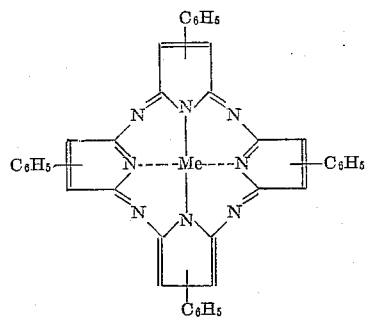

in which Me represents two atoms of hydrogen or one atom of a divalent metal, such as copper, iron, zinc, nickel, cobalt, tin, magnesium or other metal having a coordination number of 4–6.

The analogy between the tetraphenyltetrazaporphins of the present invention and the phthalocyanines is evident from an inspection of the above formula. However, there are important structural differences possessed by the novel compounds which set them apart and distinct from the phthalocyanines. Thus, the novel coloring matters contain no isoindole nuclei, four of which are present in each molecule of phthalocyanine. Instead, a phenyl group is attached separately to each of the pyrrole nuclei in the tetrazaporphin by a single bond producing an entirely different structure than is found in the phthalocyanines.

The compounds of the present invention are useful coloring matters for a variety of purposes, particularly as oil-soluble colors and for coloring plastics such as the polystyrenes, polyvinyls, etc. The novel products show bright greenish blue shades (bright emerald). In addition, the metal-free tetraphenyltetrazaporphin and certain of the metallized derivatives, such as magnesium tetraphenyltetrazaporphin, exhibit a strong deep red fluorescence in solution in organic solvents such as pyridine, alcohol, etc.

The novel metallized compounds may be prepared by methods analogous to those used in the preparation of metallized phthalocyanines, namely, by treatment of phenylmaleonitrile with an appropriate metal such as copper powder at an elevated temperature. However, it is preferred to form a metallized derivative containing a labile metal such as magnesium, sodium, potassium, aluminum, etc., which may then be demetallized to form the metal-free tetraphenyltetrazaporphin. In this procedure, a metal such as magnesium, for example, is reacted in the form of its alkoxide, such as the methoxide, ethoxide, propoxide, butoxide, etc., with phenylmaleonitrile to form magnesium tetraphenyltetrazaporphin. The magnesium complex of tetraphenyltetrazaporphin so obtained may readily be converted to various inorganic acid salts of the metal-free tetraphenyltertazaporphin such as the chloride, sulfate, nitrate, etc., or to the organic acid salts such as the formate, acetate, propionate, etc., as by treatment of magnesium tetraphenyltetrazaporphin with glacial acetic acid, for example.

Metal-free tetraphenyltetrazaporphin may also be readily obtained from the acid salts by treatment of the salts with an organic base such as ethanolamine, triethanolamine, pyridine, quinoline, etc. The use of the organic basic reagents is preferred over the inorganic basic reagents because the organic bases have greater solvent power for the tetraphenyltetrazaporphin derivatives and the conversion to the metal-free compound proceeds much more quickly. Pyridine is particularly preferred in the demetallization reaction since it is an efficient vehicle for the conversion reaction due to the higher solubility of the tetraphenyltetrazaporphin salts in this solvent.

In addition, the metal-free tetraphenyltetrazaporphin may be easily converted to other metallic derivatives by reacting a salt of an appropriate metal such as the acetate, chloride, sulfate, etc., of copper, iron, zinc, cadmium, sodium, calcium, barium, nickel, cobalt, tin, magnesium, etc., with metal-free tetraphenyltetrazaporphin.

Also, other metallized derivatives may be obtained by metal exchange. That is, a suitable metal such as copper powder is heated with magnesium tetraphenyltetrazaporphin in a suitable solvent such as o-dichlorobenzene or boiling pyridine whereby a direct exchange of metal occurs.

The invention will be described in greater detail in conjunction with the following specific examples in which the parts are by weight unless otherwise specified:

EXAMPLE 1

*Magnesium tetraphenyltetrazaporphin*

To 200 parts of n-propanol is added 3 parts of magnesium turnings. The reaction of the magnesium with the propanol is initiated by the addition of a small crystal of iodine and the mixture is then heated at the reflux temperature until solution of the magnesium is complete. There is then gradually added, 12 parts of phenylmaleonitrile and the mixture is heated to reflux. The solvent is removed by distillation from a steam bath at reduced pressure and the residue is extracted with benzene. Chromatography of the benzene solution on an activated alumina column and extraction of the red fluorescent band with 3:1 benzene:methanol and removal of the solvent by distillation gives a good yield of pure magnesium tetraphenyltetrazaporphin in the form of a dark solid showing a purple reflex. In solution in organic solvents such as benzene, pyridine, or alcohol, it gives a greenish-blue solution which possesses a strong red fluorescence even in daylight.

EXAMPLE 2

*Copper tetraphenyltetrazaporphin*

Equal parts of phenyimaleonitrile and copper powder are heated at 275° C. until the reaction is complete. The resulting product is extracted with pyridine and the pyridine extract is chromotagrammed through an activated alumina column. Elution of the bottom bright greenish-blue band with pyridine, followed by drowning in water gives copper tetraphenyltetrazaporphin. In solution in organic solvents such as benzene, and pyridine, it shows a bright greenish-blue color.

EXAMPLE 3

*Copper tetraphenyltetrazaporphin*

A mixture of 2.6 parts of magnesium tetraphenyltetrazaporphin and 2 parts of copper powder in 200 parts of pyridine is stirred and heated at the reflux temperature until the red fluorescence of the magnesium derivative disappears. The cooled pyridine solution is then put through an activated alumina column and the bottom bright greenish-blue band is eluted with pyridine. Drowning of the eluate in water and removal of the product by filtration gives a good yield of copper tetraphenyltetrazaporphin.

EXAMPLE 4

*Tetraphenyltetrazaporphin acetate*

To 50 parts of glacial acetic acid is added 2 parts of magnesium tetraphenyltetrazaporphin and the mixture is heated with stirring at the reflux temperature until the reaction is substantially complete. After cooling, the mixture is poured into 200 parts of water. The black solid is removed by filtration, thoroughly washed with water and dried. A good yield of the monoacetate salt of tetraphenyltetrazaporphin is obtained. This dissolves in pyridine to give a bright green-blue solution.

EXAMPLE 5

*Tetraphenyltetrazaporphin sulfate*

A solution of one part of tetraphenyltetrazaporphin in 10 parts of concentrated sulfuric acid is drowned in 100 parts of water. The sulfate salt of tetraphenyltetrazaporphin precipitates in the form of a black solid and is removed by filtration and dried.

EXAMPLE 6

*Metal-free tetraphenyltetrazaporphin*

A solution of 13 parts of tetraphenyltetrazaporphin monoacetate salt in 500 parts of hot pyridine is filtered and the pyridine is removed from the greenish-blue solution by distillation at reduced pressure from a steam bath. An excellent yield of metal-free tetraphenyltetrazaporphin is obtained in the form of a dark blue solid. This forms a bright greenish-blue solution in pyridine.

EXAMPLE 7

*Nickel tetraphenyltetrazaporphin*

30 parts of metal-free tetraphenyltetrazaporphin and 13 parts of anhydrous nickel chloride are added to o-dichlorobenzene and the mixture is heated at the boiling point until the reaction is substantially complete. After filtering and cooling, the solid is removed by filtration giving a good yield of pure nickel tetraphenyltetrazaporphin.

EXAMPLE 8

*Cobalt tetraphenyltetrazaporphin*

30 parts of metal-free tetraphenyltetrazaporphin and 18 parts of cobalt acetate are added to 500 parts of o-dichlorobenzene. The mixture is heated at the boiling point until the reaction is substantially complete. By cooling and filtration there is obtained a good yield of cobalt tetraphenyltetrazaporphin.

I claim:

1. Tetraphenyltetrazaporphin of the formula:

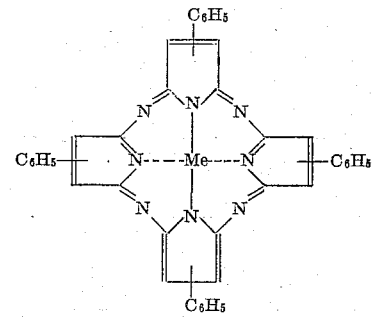

in which Me represents atoms selected from the group consisting of two atoms of hydrogen and one atom of a divalent metal having a coordination number of 4–6.

2. A compound according to claim 1 in which Me is magnesium.

3. A compound according to claim 1 in which Me is copper.

References Cited in the file of this patent

UNITED STATES PATENTS

| | | |
|---|---|---|
| 2,681,344 | France et al. | June 15, 1954 |
| 2,681,345 | France et al. | June 15, 1954 |
| 2,681,346 | France et al. | June 15, 1954 |

FOREIGN PATENTS

| | | |
|---|---|---|
| 689,389 | Great Britain | Mar. 25, 1953 |

OTHER REFERENCES

Jour. Chem. Soc. (London), 1952, pages 4844–45.